(12) United States Patent
Keith

(10) Patent No.: US 7,076,066 B2
(45) Date of Patent: Jul. 11, 2006

(54) LAPDESK

(76) Inventor: Harold John Keith, 2227 S. 15th Ave., Broadview, IL (US) 60153

( * ) Notice: Subject to any disclaimer, the term of this patent is extended or adjusted under 35 U.S.C. 154(b) by 511 days.

(21) Appl. No.: 09/767,161

(22) Filed: Jan. 23, 2001

(65) Prior Publication Data

US 2002/0097875 A1    Jul. 25, 2002

(51) Int. Cl.
*H04K 1/00*        (2006.01)
(52) U.S. Cl. .......................................... 380/270; 726/3
(58) Field of Classification Search ................ 380/270; 455/420, 432; 726/3, 15; 715/740
See application file for complete search history.

(56) References Cited

U.S. PATENT DOCUMENTS

| | | | | |
|---|---|---|---|---|
| 6,542,740 B1 * | 4/2003 | Olgaard et al. | ............. | 455/515 |
| 6,571,245 B1 * | 5/2003 | Chun et al. | ................... | 707/10 |
| 6,622,018 B1 * | 9/2003 | Erekson | ...................... | 455/420 |
| 6,748,200 B1 * | 6/2004 | Webster et al. | .......... | 455/234.1 |
| 6,999,945 B1 * | 2/2006 | Freeny, Jr. | ................... | 705/50 |

* cited by examiner

*Primary Examiner*—Emmanuel L. Moise
*Assistant Examiner*—MinhDieu Nguyen

(57) ABSTRACT

A laptop device, battery powered, wireless remote control station transmits encrypted device signals to a receiver interfaced with a host desktop computer. The laptop device includes a microprocessor, which converts Input/Output device signals into a secured code and transmits the secured code to a computer interface transceiver using the same frequency. The laptop device receives and sends signals to the keyboard, monitor, joystick, mouse, speakers and microphone. The computer interface transceiver called the Base Unit only recognizes or accepts secured signals with authenticated encryption passwords. For the signals accepted the Base Unit forwards the signals to the host computer via a physical connection to the appropriate device. The Base Unit also transmits the secured signal codes back to the laptop device called UIU (User Interface Unit) which then allocates the signal to the appropriate device located on the UIU. In addition, all screen displays that originate in the computer will be transmitted to the UIU and displayed on the display therein in a secure manner.

1 Claim, 4 Drawing Sheets

LAPDESK

CROSS-REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

After thorough research was conducted there is not any technology that functions like LapDesk.

BRIEF SUMMARY OF THE INVENTION

LapDesk 1400 is wireless technology combined with laptop technology. LapDesk 1400 consist of a base unit and a User Interface Unit (UIU). The base unit has a powerful antenna sending and receiving information from the UIU, a jack for a longer range antenna (optional), and also has several connections that go directly to the users desktop. These connection cables coming from the base unit to the desktop will provide for an automatic signal bypass for monitor, keyboard, mouse, joystick, speakers, and microphone. The second version of the base unit will work the same as the prior stated version with the exception of the connection cables which will be replace with one cable for the monitor and one USB connection which will interface with desktop devices as prior stated devices. The UIU consist of an active flat screen, processor, keyboard, touch pad mouse, speakers, microphone, and jacks for an external joystick, mouse and keyboard and a small antenna.

BRIEF DESCRIPTION OF THE SEVERAL VIEWS OF THE DRAWING

Drawings—FIGS.

DRAWING—REFENCE NUMERALS

Figure 1:
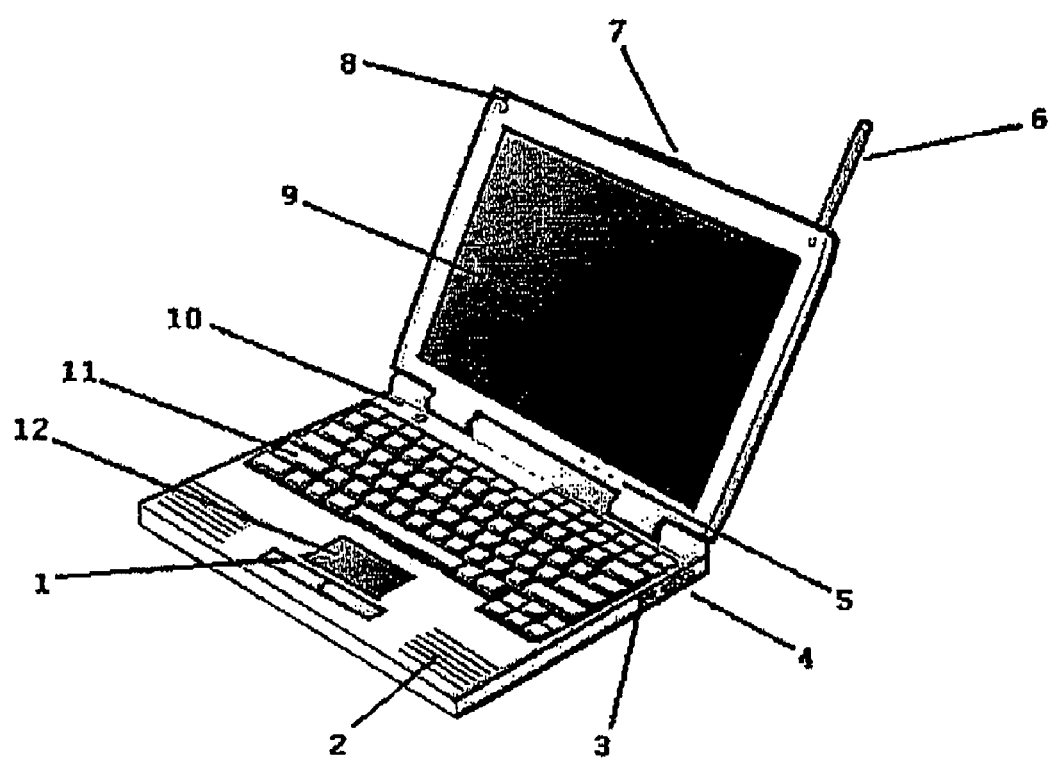
FIG. 1 shows various aspects of the front view of the User Interface Unit.
Figure 2:
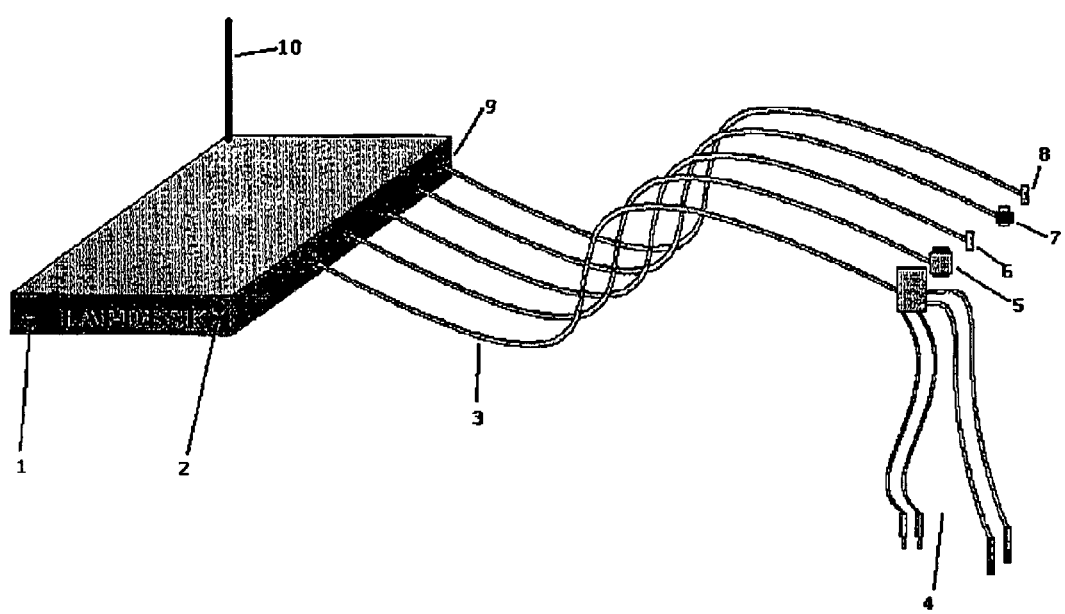
FIG. 2 shows various aspects of the front view of the Base Unit 1 with 5 remote connections.
Figure 3:
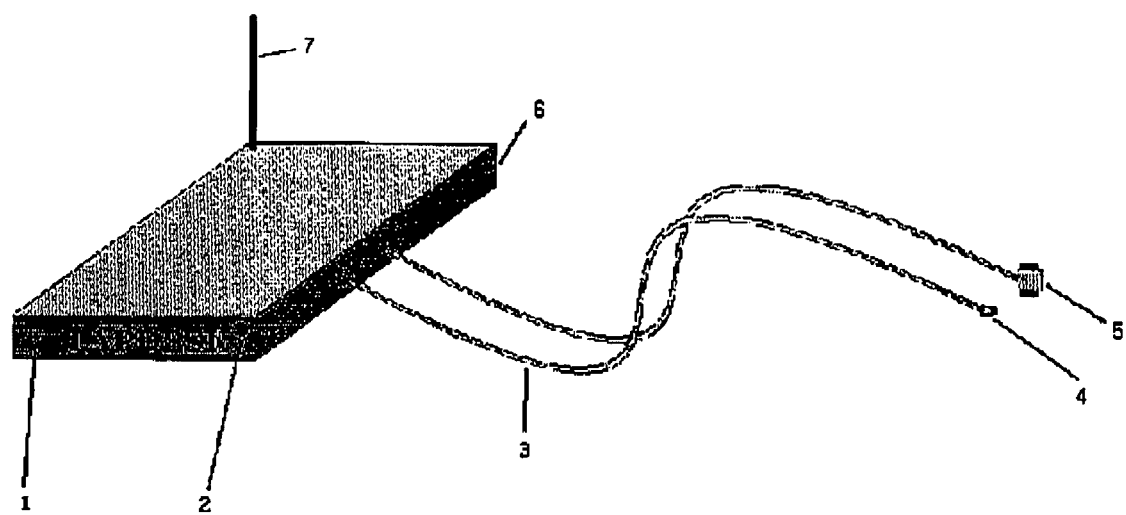
FIG. 3 shows various aspects of the front view of the Base Unit 2 with one USB connector and one remote connector.

FIG. 1—UIU Front Side View

1. Mouse buttons commands are converted into signals which are transmitted to the Base Unit that converts the signals back into commands and sends to mouse port.
2. Stereo speakers that receives audio signals from Base Unit that converts remote computer audio output into signals.
3. The UIU device has a headphone port for optional listening.
4. Digital joystick part commands are converted to wireless signals and received by the Base Unit which convert the signal into commands and routes the commands to the joystick device port.
5. Power indicator lights show signal strength, battery strength, and power status.
6. Fold down Power Antenna allows user to conceal antenna for safe storage.
7. Locking latch secures screen and antenna.
8. Microphone commands are converted to wireless signals and received by the Base Unit which converts the signal into commands and routes the commands to the microphone device port.
9. The UIU will receive display signals to a SXGA high resolution color screen receives for the Base Unit that converts the signal from the remote computer.
10. The UIU contains one button for power operations.
11. The UIU device contains a heavy-duty keyboard which commands are converted into signals and received by the Base Unit, the signals are converted again back into commands that are sent to the keyboard port.
12. A touch pad mouse or ball roller type mouse will be included on the UIU device which commands are converted into signals which are transmitted to the Base Unit that converts the signals back into commands and sends to mouse port.

FIG. 2—Base Unit 1

1. The Base Unit has a power indicator light that will remain on during operation.
2. The Base Unit has a connection indicator light that will show connection and activity.
3. The Base Unit has double ply data cables with signal pass-through connectors.
4. Microphone and external speaker male and female pass-through connectors allow users to plug the remote device into connector and also plug pass-through connector into remote computer's microphone and external speaker.
5. Joystick pass-through connectors allow users to plug the remote device into connector and also plug pass-through connector into remote computer's joystick port.
6. Keyboard connectors allow users to plug the remote device into connector and also plug pass-trough connector into remote computer's keyboard port.
7. Monitor connectors allow users to plug the remote device into connector and also plug pass-through connector into remote computer's monitor port.
8. Mouse connectors allow users to plug the remote device into connector and also plug pass-through connector into remote computer's mouse port.
9. Power port will fit standard power supply.
10. Digital high powered antennae will send/receive encrypted signals to/from UIU device.

FIG. 3—Base Unit 2

1. Power indicator lights show signal strength, battery strength, and power status.
2. The Base Unit has a connection indicator light that will show connection and activity.
3. The Base Unit has double ply data cables with signal pass-through connectors.
4. The Base Unit has a USB connection which acts as a mouse, keyboard, joystick, audio device with speakers and microphone devices connected to the remote computer.
5. Monitor connectors allow users to plug the remote device into connector and also plug pass-through connector into remote computer's monitor port.

6. Power port will fit standard power supply.
7. Digital high powered antennae will send/receive encrypted signals to/from UIU device.

Figure 4:
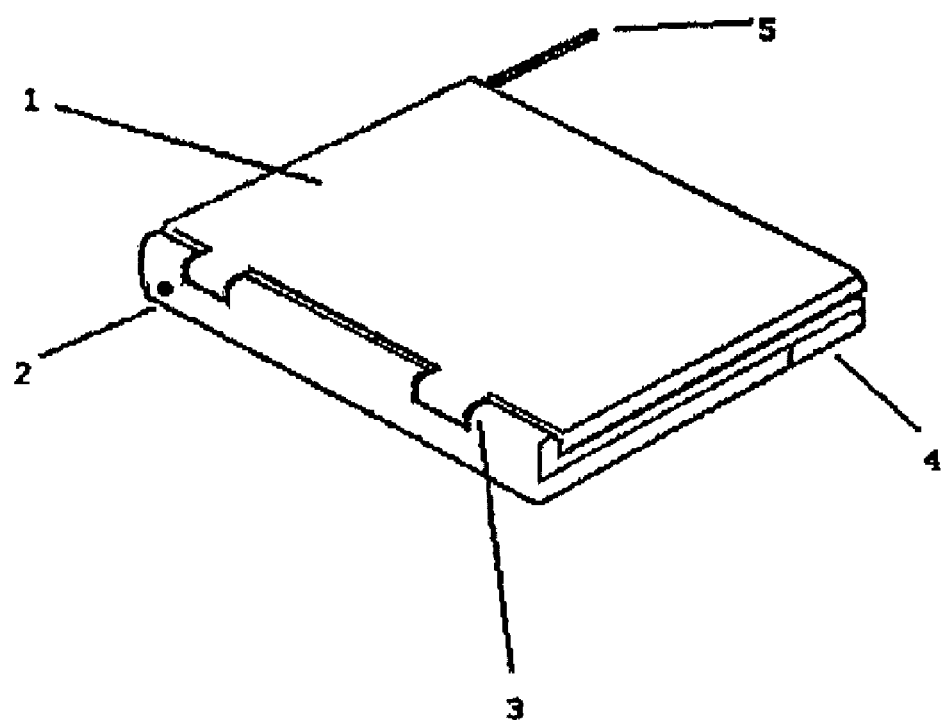
FIG. 4 shows various aspects of a closed back of the User Interface Unit.

FIG. 4—UIU Rear View

1. Locking latch secures screen and antenna when closed.
2. Power port will fit standard power supply
3. A heavy-duty Screen hinge allows user long lasting ability to open and close UIU device.
4. The UIU device will have a high capacity battery that fits within the unit
5. Fold down Power Antenna allows user to conceal antenna for safe storage.

DETAILED DESCRIPTION OF THE INVENTION

LapDesk 1400 allows a user to communicate with wireless technology to a remote control device called the Base Unit that is connected to the desktop and it's devices or simulated through a USB connection to device interrupts. The Base Unit then converts signals going to the monitor, external speakers, mouse and joystick to a encrypted signal with random seeds for security. These signals are transmitted to a portable device called the UIU (User Interface Unit). The UIU decodes the signals and converts it back into it's original signal and directs the signal to its appropriate devices located on the portable device.

Once encrypted signal is authenticated with a security code, access will be granted for a remote access session. Remote access security is maintained by encrypting the security code within every signal transmitted between the UIU and Base Unit. The base unit has a number that is stamped on the bottom that corresponds to it encrypted signal. The signal generated from the UIU is then verified with the number known to the base unit as a second security measure.

What is claimed is:

1. A system for controlling a remote desktop or computer system over a wireless connection, said system comprising:
   a) A portable device defined as User Interface Unit (UIU) for communicating with a Base Unit over a wireless connection comprising:
   a bus;
   a processor coupled to said bus;
   a transceiver coupled to said bus, said transceiver for transmitting/receiving encrypted commands to the base unit over said wireless connection;
   a screen device coupled to said bus, said screen device adapted to display remote screen output information through said wireless connection to base unit wherein base unit is connected to the remote computer system video output port on remote computer system;
   a keyboard coupled to said bus, said keyboard input device is adapted to send keystroke commands through said wireless connection to base unit wherein base unit is connected to the keyboard input ports or keyboard software interrupts on remote computer system;
   a touch pad device coupled to said bus, said touch pad input device is adapted to send mouse movement commands through said wireless connection to base unit wherein base unit is connected to the mouse input ports or mouse software interrupts on remote computer system;
   a speaker system coupled to said bus, said speaker system is adapted to receive speaker signals through said wireless connection to base unit wherein base unit is connected to the speaker output ports or setup through USB connection as speaker device on the remote computer system;
   a microphone system coupled to said bus, said microphone system is adapted to send signals through said wireless connection to base unit wherein base unit is connected to the microphone port or setup through a USB connection as microphone device on the remote computer system;
   a joystick port coupled to said bus, said joystick port is adapted to send joystick signals through said wireless connection to base unit wherein base unit is connected to the joystick port or setup through a USB connection as a joystick device on the remote computer system;
   a memory coupled to said bus, said memory is adapted to hold security codes.
   b) A Base Unit comprising:
   a bus;
   a processor coupled to said bus;
   a transceiver coupled to said bus, said transceiver for receiving/transmitting encrypted commands to said portable device over said wireless connection;
   a video connection coupled to said bus, said video connection is adapted to send video screen commands through said wireless connection to said UIU wherein base unit is hard wired to the remote computer system video output port on remote computer system;
   a keyboard connection coupled to said bus, said keyboard connection is adapted to receive keystroke commands through said wireless connection to base unit wherein base unit is hard wired to the keyboard input ports or keyboard software interrupts on remote computer system;
   a mouse connection coupled to said bus, said mouse connection adapted to receive mouse movement commands through said wireless connection from UIU device wherein base unit is hard wired to the mouse input ports or mouse software interrupts on remote computer system;
   a speaker connection coupled to said bus, said speaker system is adapted to send speaker signals through said wireless connection to UIU device wherein base unit is hard wired to the speaker output ports or setup through a USB connection as speaker device on the remote computer system;
   a microphone system coupled to said bus, said microphone system is adapted to send signals through said wireless connection from UIU device wherein base unit is hard wired to the microphone port or setup through a USB connection as microphone device on the remote computer system;
   a joystick connection coupled to said bus, said joystick port is adapted to send joystick signals through said wireless connection from the UIU device wherein base unit is hard wired to the joystick port or setup through a USB connection as a joystick device on the remote computer system.

* * * * *